United States Patent [19]

Nagashima

[11] 4,174,167
[45] Nov. 13, 1979

[54] INTERCHANGEABLE LENS FOR CAMERAS

[75] Inventor: Motoi Nagashima, Tokyo, Japan

[73] Assignee: Cima Kogaku Company Limited, Tokyo, Japan

[21] Appl. No.: 814,125

[22] Filed: Jul. 8, 1977

[30] Foreign Application Priority Data

Jul. 9, 1976 [JP] Japan .................................. 51-81527

[51] Int. Cl.² .......................... G03B 9/07; G03B 17/00
[52] U.S. Cl. ..................................... 354/196; 354/286
[58] Field of Search ..................... 354/40, 46, 195, 196, 354/228, 232, 202, 286, 270, 272, 273, 274

[56] References Cited

U.S. PATENT DOCUMENTS

| | | | |
|---|---|---|---|
| 1,950,166 | 3/1934 | Durholz | 354/196 |
| 3,106,883 | 10/1963 | Erbe | 354/196 |
| 3,633,483 | 1/1972 | Nagashima | 354/196 |
| 3,858,225 | 12/1974 | Hasegawa et al. | 354/46 |
| 3,889,282 | 6/1975 | Hashimoto | 354/196 |
| 3,922,699 | 11/1975 | Yamaki | 354/270 |
| 3,997,906 | 12/1976 | Kashiwase | 354/196 |

Primary Examiner—Donald A. Griffin
Attorney, Agent, or Firm—Cushman, Darby & Cushman

[57] ABSTRACT

An interchangeable lens for cameras which can be modified so as to be able to be fitted to all types of cameras by only interchanging mount assemblies containing various different types of diaphragm operating means by using a lens barrel assembly containing a lens system and diaphragm blade means in common. In order to make the mass production and maintenance of high performances possible, this interchangeable lens includes a diaphragm operating lever which can be pivoted to the lens barrel assembly by a pin-hole connection and a diaphragm controlling cam ring and diaphragm correcting cam ring which can be rotatably held between the lens barrel assembly and mount assembly.

4 Claims, 14 Drawing Figures

FIG. 13

INTERCHANGEABLE LENS FOR CAMERAS

BACKGROUND OF THE INVENTION (a) Field of the Invention

The present invention relates to improvements in the structure of an interchangeable lens for cameras.

(b) Description of the Prior Art

The diaphragm means built in an interchangeable lens for cameras is operated by a diaphragm operating mechanism built in camera bodies. In such case, there are two kinds of types wherein the diaphragm means is operated respectively by a member rotating concentrically with the optical axis and by a member advancing and retreating in the direction of the optical axis. These two types are variously adopted by camera makers depending on the kinds of cameras. Anyhow the interchangeable lens to be used for a specific camera is specified in fact by the kind of the diaphragm operating mechanism of the camera, the amount of movement of the above mentioned member and the kind of the lens mount. Therefore, particularly the makers exclusively of interchangeable lenses are obliged to produce a small quantity of many kinds of interchangeable lenses.

SUMMARY OF THE INVENTION

Therefore, a primary object of the present invention is to provide an interchangeable lens which can be varied in the structure so as to be applicable to cameras of either of the above mentioned types by only interchanging some parts in the case of the assembling.

Another object of the present invention is to provide the structure of an interchangeable lens for cameras which can be mass-produced and is high in the precision of the diaphragm aperture to be controlled.

These and other objects of the present invention will become more apparent during the course of the following detailed description and appended claims.

DESCRIPTION OF THE PREFERRED EMBODIMENTS

First of all, the embodiment in the case of applying the present invention to a zoom lens shall be explained with reference to FIGS. 1 to 4. Reference symbol A indicates a lens barrel assembly. Symbol B indicates a mount assembly separably secured to the rear end portion of the lens barrel assembly A by using screws C. Numeral 1 indicates a fixed ring having a bracket 1a (FIG. 2) projected inward from the inner peripheral surface in the rear portion and to be connected to the mount asembly through the screws C. Numeral 2 indicates a ring fitted and fixed to the fixed ring 1, forming a groove 2a concentric with the optical axis in a portion of the peripheral wall and having a fixed index 2b and focal depth indicating graduations 2c on the outer peripheral surface. Numeral 3 indicates a zooming ring screwed to the ring 2 and provided on the outer peripheral surface with resultant focal distance indicating graduations 3a of the lens system to be indicated by the fixed index 2b and on the inner surface with a key groove 3b in the direction of the optical axis. Numeral 4 indicates a focusing ring rotatably fitted to the ring 2 and provided on the peripheral surface with distance graduations 4a to be indicated by the fixed index 2b. Numeral 5 indicates an interlocking ring rotatably fitted in a portion to the fixed ring 1, connected in its rear end portion to the zooming ring 3 by a pin 5a loosely fitted in the key groove 3b and inserted in the annular groove 2a and forming on the peripheral wall in the front end portion a guide groove 5b diagonal to the optical axis. Numeral 6 indicates a helical ring secured to the interlocking ring 5 and provided on the inner peripheral surface with a helical thread. Numeral 7 indicates a lens supporting barrel having on the outer peripheral surface in the rear portion a helical thread screwed to the helical ring 6, in the intermediate portion a straight groove 7a along the optical axis and on the outer peripheral surface in the front portion a helical thread and provided in the rear end portion with a first lens group $L_1$ and a diaphragm blade means F set in the lens group $L_1$. Numeral 8 indicates a lens supporting ring slidably inserted in the lens supporting barrel 7 and provided with a pin 8a slidably fitted in common in the groove 5b diagonal to the optical axis and the straight groove 7a parallel with the optical axis and a second lens group $L_2$. Numeral 9 indicates a lens supporting ring supporting a third lens group $L_3$, connected to the focusing ring 4 and screwed in a portion with the helical thread provided in the front portion of the lens supporting barrel 7. In the above mentioned zoom lens apparatus, the spiral direction of the helical thread and the angle of the diagonal groove 5b with the optical axis are so selected that, for example, when the zooming ring 3 is rotated clockwise, the lens supporting ring 8 may be retreated and the resultant focal distance of the entire lens system may be varied so as to be read with the fixed index 2b and graduations 3a and, when the focusing ring 4 is rotated, only the lens supporting ring 9 may be moved forward or rearward so as to make focusing. However, as these are not related directly with the present invention, the structure and operation shall not be explained in detail. By the way, on these points, for example, U.S. Pat. No. 3,752,565 can be referred to.

Figure 1:
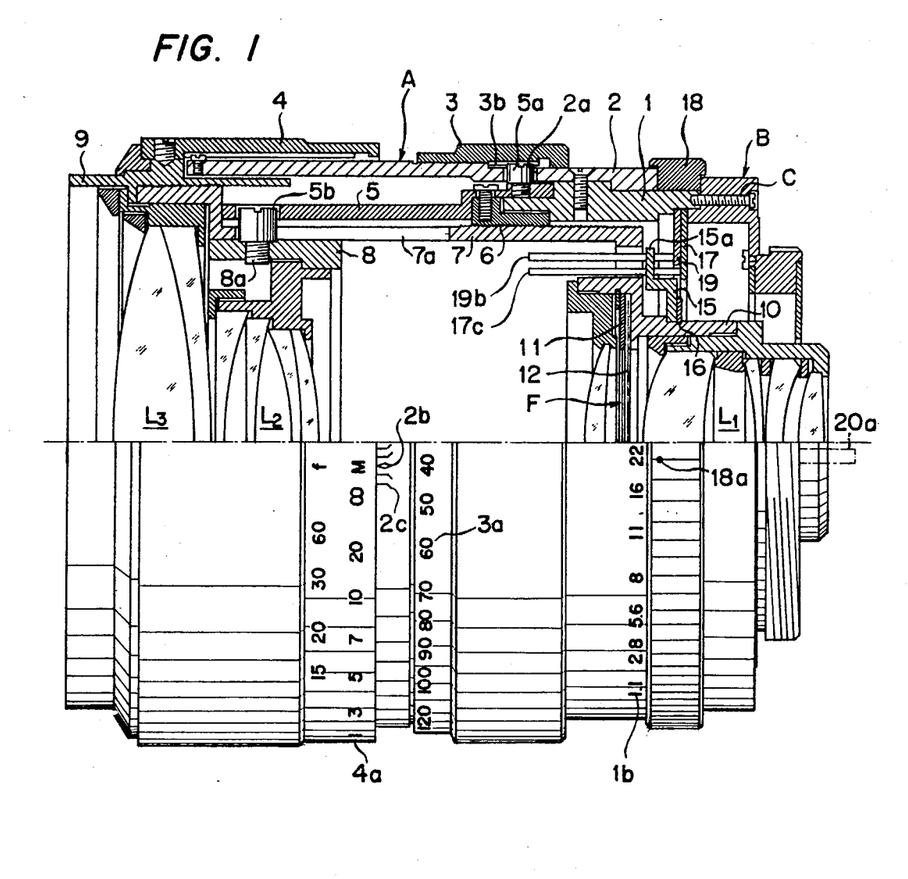
FIG. 1 is a side view of an interchangeable lens for cameras embodying the present invention shown as sectioned in the upper half.
Figure 2:
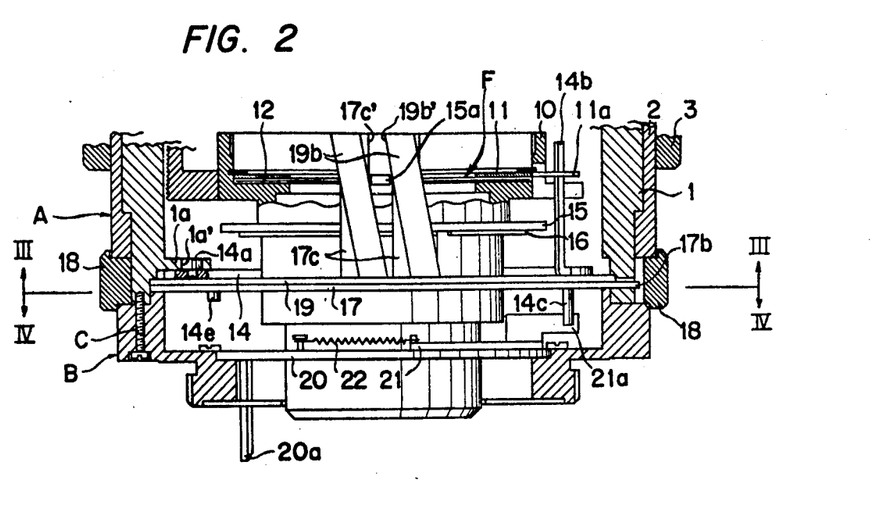
FIG. 2 is a plan view of an essential portion as seen from above in FIG. 1 by sectioning the outer cylindrical portion of the interchangeable lens shown in FIG. 1.
Figure 3:
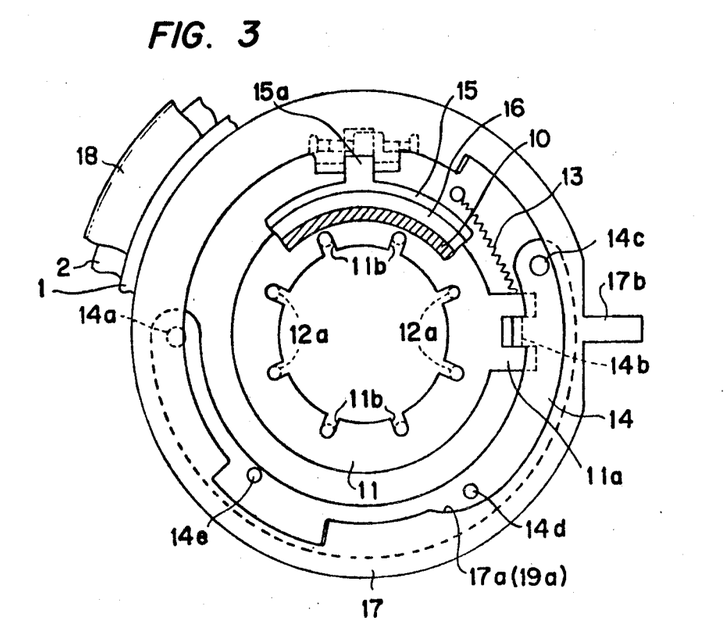
FIG. 3 is a sectional view along line III—III in FIG. 2.

As clearly shown in FIGS. 2 and 3, the diaphragm blade means F comprises a diaphragm actuating ring 11 rotatably fitted on a lens barrel 10 secured to the rear end of the lens supporting barrel 7 and having a forked portion 11a projected radially of said lens barrel 10 and a plurality of slots 11b (FIG. 3) formed radially from the inner peripheral edge, and a plurality of blades 12 having pins 12a set between a portion of the lens barrel 10 and the diaphragm actuating ring 11 and fitted in the slots 11b of the disphragm actuating ring 11 and pins (not illustrated) fitted in through holes (not illustrated) provided in the lens barrel 10 and opened and closed with the rotation of the diaphragm actuating ring 11. Numeral 13 (FIG. 3) indicates a spring resiliently pressing the diaphragm actuating ring 11 in the direction of opening the diaphragm blades 12, that is, counterclockwise in the position in FIG. 3. Numeral 14 indicates an arcuate diaphragm actuating lever provided on one side with a pin 14a rotatably fitted in a through hole 1a' made in the bracket 1a and a bent piece 14b fitted in the forked portion 11a of the diaphragm actuating ring 11 and on the other side with pins 14c, 14d and 14e. Numeral 15 indicates a ring rotatably fitted on the lens barrel 10 and having a bent piece 15a which is Z-shaped in the cross-section. Numeral 16 indicates a C-ring fitted on the lens barrel 10 to prevent the movement of the ring 15 in the direction of the optical axis. Numeral 17 indicates a diaphragm controlling cam ring held so as to be rotatable concentrically with the optical axis between the rear end surface of the lens barrel assembly A, that is, the fixed ring 1 and the front end surface of the mount assembly B and provided with a diaphragm controlling cam 17a (FIG. 3) with which the pin 14d of the diaphragm actuating member 14 is to be in contact, an arm 17b projecting in the radial direction and a bent piece 17c having a straight groove 17c' formed in the direction of the optical axis to fit the bent piece 15a of the ring 15. Numeral 18 indicates a diaphragm setting ring fitted rotatably outside the fixed ring 1, connected with the arm 17b projected out of the diaphragm controlling cam ring 17 and having on the outer peripheral surface an indicator 18a for indicating an F-value to be set in cooperation with the diaphragm graduations 1b provided on the outer peripheral surface of the fixed ring 1. Numeral 19 indicates a diaphragm correcting cam ring held so as to be rotatable concentrically with the optical axis between the rear end surface of the fixed ring 1 and the front end surface of the mount assembly B in the same manner as in the diaphragm controlling cam ring 17 and provided in the position in which it can conform to the diaphragm controlling cam 17a with a diaphragm correcting cam 19a having a cam surface which is of the same shape as of said diaphragm cam 17a and with which the pin 14d of the diaphragm actuating lever 14 is to be in contact and a bent piece 19b having a cam groove 19b' fitting the bent piece 15a of the ring 15 and formed so as to be diagonal to the optical axis.

Figure 4:
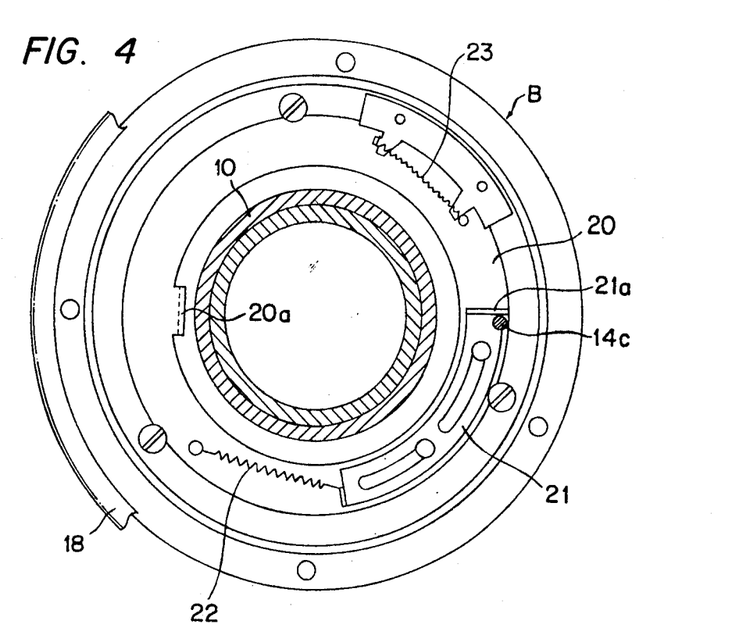
FIG. 4 is a sectional view along line IV—IV in FIG. 2.

In FIGS. 2 and 4, numeral 20 indicates a diaphragm operating ring rotatably mounted concentrically with the optical axis by screws on the inside stepped portion of the cylindrical mount assembly B and having a bent piece 20a projecting rearward of the mount assembly B. Numeral 21 indicates an arcuate sliding piece slidably mounted by a pin-slot connection on the diaphragm operating ring 20 and having a bent piece 21a engaged with the pin 14c of the diaphragm actuating lever 14. Numeral 22 indicates a spring biasing the sliding piece 21 clockwise in the position in FIG. 4. Numeral 23 indicates a spring biasing the diaphragm operating ring 20 counterclockwise.

As evident from the above explanation, the lens barrel assembly A includes the fixed ring 1, focal depth indicating graduations 2, zooming ring 3, focusing ring 4, interlocking ring 5, helicoid ring 6, lens supporting barrel 7, lens supporting rings 8 and 9, lens barrel 10, first lens group $L_1$, diaphragm blade means F, second lens group $L_2$, third lens group $L_3$, diaphragm actuating lever 14 and ring 15.

The operation of the above mentioned apparatus shall be explained in the following.

When the lens body is mounted on the camera body and the diaphragm operating ring 20 is rotated to the position in FIG. 4, that is, to the position of the extremity of the counterclockwise rotation, the bent piece 20a will be engaged with the diaphragm operating mechanism (not illustrated) provided in the camera body. Therefore, when the lens body is mounted on the camera body, in whatever setting position the diaphragm setting ring 18 may be, the diaphragm blade means F will be held with the diaphragm blades 12 fully opened. Thus when the diaphragm operating ring 20 is clockwise rotated from the position in FIG. 4 by the above mentioned diaphragm operating mechanism in relation to the movement of the shutter button or mirror on the camera body side, by the engagement of the bent portion 21a and pin 14c with each other, the diaphragm operating lever 14 will be rotated clockwise with the pin 14a as a rotation axis from the position in FIG. 3 and, at the same time, the diaphragm actuating ring 11 will be rotated clockwise against the spring 13. Therefore, the diaphragm blades 12 will be gradually advanced into the light path from the fully opened position to make small the light path area and, when the pin 14d contacts the diaphragm controlling cam 17a, the diaphragm blades 12 will be stopped and the diaphragm aperture will be determined. The position of the diaphragm controlling cam 17a will be selected by the rotating position of the diaphragm controlling cam ring 17, that is, the diaphragm setting ring 18. However, this rotating position will be read as a diaphragm value by the cooperation of the diaphragm graduations 1b and indicator 18a. After thus the pin 14d contacts the diaphragm controlling cam 17a and the diaphragm operating lever 14 is stopped, only the diaphragm operating ring 20 will be further rotated clockwise against the resiliencies of the springs 22 and 23 to the position of the extremity of the clockwise rotation. Operatively connected with the movement of the mirror into the light path after the end of the photographing, the diaphragm operating ring 20 will be again returned to the position in FIG. 4 through the above mentioned diaphragm operating mechanism, the diaphragm blade 12 will be again returned to the fully opened position and one operation will be completed. In this case, when the resultant focal distance, that is, the magnification of the lens system is varied by the operation of the zooming ring 3, the absolute value of the diaphragm aperture will be also varied in response to said variation and the brightness as of the lens will be always kept constant. That is to say, when the lens barrel 10 is moved forward or rearward by the zooming operation, the bent piece 15a of the ring 15 will move within the grooves 17c' and 19b' as a result. Therefore, by this movement of the bent piece 15a, the correcting cam ring 19 will be slightly rotated clockwise or counterclockwise independently of the diaphragm controlling cam ring 17. For example, when the resultant focal distance of the lens system is increased, the pin 14d of the diaphragm operating lever 14 will contact the diaphragm correcting cam 19a before contacting the diaphragm controlling cam 17a, the absolute value of the diaphragm aperture will be also increased in response to the increase of the resultant focal distance and the set diaphragm value will be corrected to be always correct.

Figure 5:
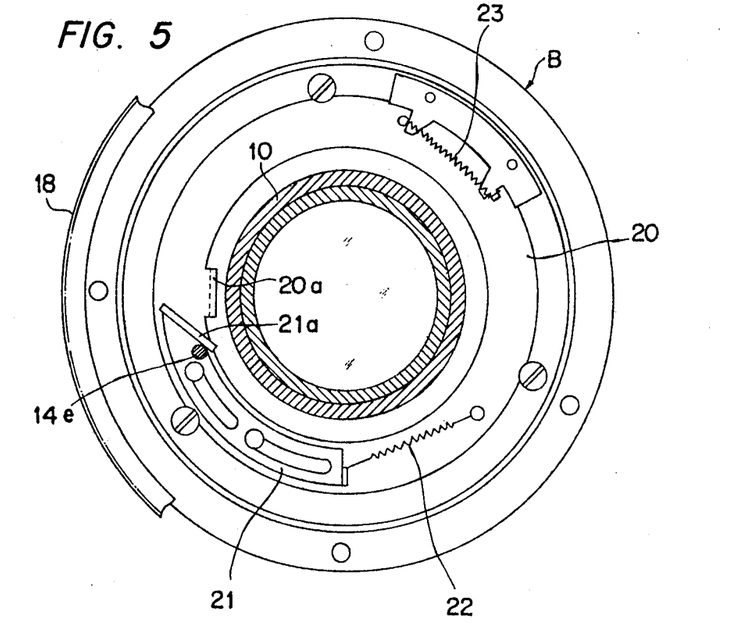
FIGS. 5 to 13 are the same sectional views of essential portions as in FIG. 4, showing respectively various embodiments different from that in FIG. 4.

FIG. 5 shows an embodiment in the case that the diaphragm operating ring 20 is modified so as to be adapted for the kind of camera in which the operating direction of the above mentioned diaphragm operating mechanism is reverse to that in the above mentioned case. According to this embodiment, a bent portion 21a of a sliding piece 21 is formed so as to make an angle with the normal of the diaphragm operating ring 20 and is positioned so as to engage with the pin 14e of the diaphragm operating lever 14. Therefore, the same as in the above described case, in the case of throttling the diaphragm blade means F, if the operating ring 20 is rotated counterclockwise, the bent portion 21a will push out the pin 14e while taking it, therefore, the same as in the above described case, the diaphragm operating lever 14 will be rotated clockwise with the pin 14a as a rotating axis until the pin 14d contacts the diaphragm controlling cam 17a or the diaphragm correcting cam 19a and thereafter only the diaphragm operating ring 20 will be further rotated counterclockwise.

In the above, there has been explained the case of a so-called push-in type wherein the diaphragm operating lever 14 is biased in the direction of fully opening the diaphragm blades 12 by the spring 13 and, when the diaphragm operating ring 20 is forcibly rotated by the diaphragm operating mechanism provided within the camera body, the diaphragm blade means F will be controlled. However, depending on the kind of the camera, there is also a so-called following type wherein the diaphragm operating lever 14 is biased in the direction of closing the diaphragm blades 12 by the same spring as the spring 13 and, when the lens body is mounted on the camera body, the diaphragm operating lever 14 will be moved so as to fully open the diaphragm blades 12 through the diaphragm operating ring 20 forcibly rotated by the diaphragm operating mechanism provided within the camera body and the diaphragm blade means F will be controlled by the diaphragm operating ring 20 rotated following the above mentioned diaphragm operating mechanism moved in relation to the operation of the release button of the camera.

Figure 6:
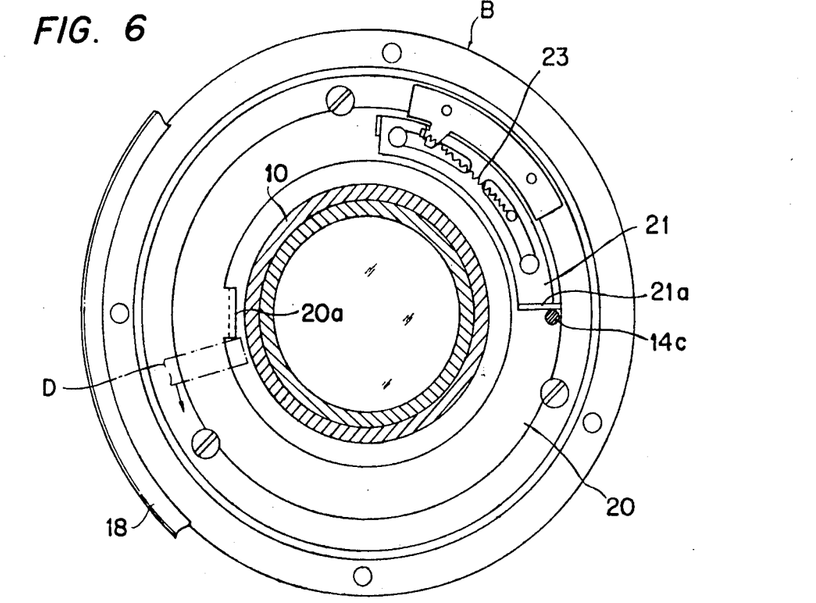
Figure 7:
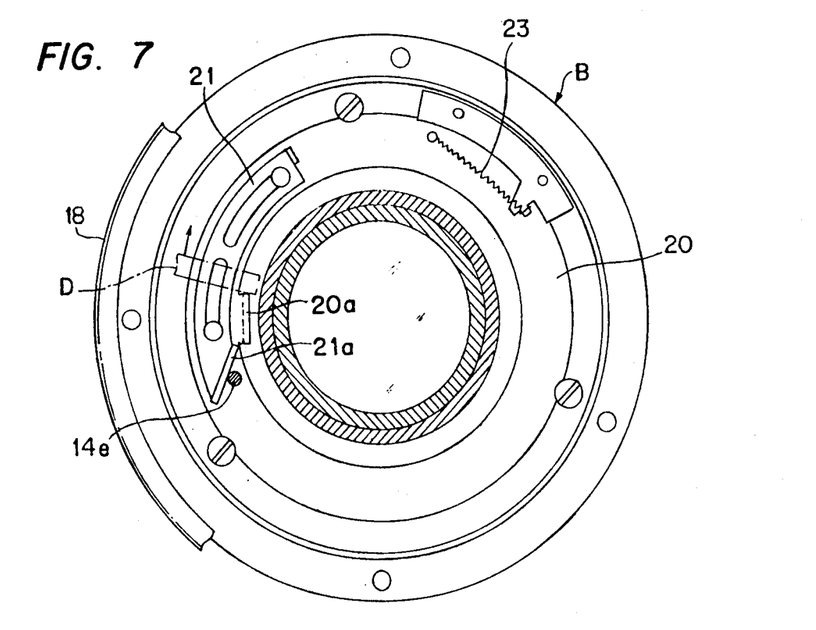

FIGS. 6 and 7 show embodiments in the case that the embodiments shown in FIGS. 4 and 5 are respectively modified so as to be adapted for the following type. That is to say, according to these embodiments, the diaphragm operating ring 20 is biased in the direction reverse to that in the case of FIGS. 4 and 5 by a spring 23, the sliding piece 21 is secured to the diaphragm operating ring 20 and the pin 14c or 14e of the diaphragm operating lever 14 is so formed as to contact the outside surface of the bent portion 21a. By the way, the drawings show the lens body as mounted on the camera body. Reference symbol D indicates a portion of the diaphragm operating mechanism provided within the camera body. The arrows indicates the operating direction of the diaphragm operating mechanism.

Figure 8:
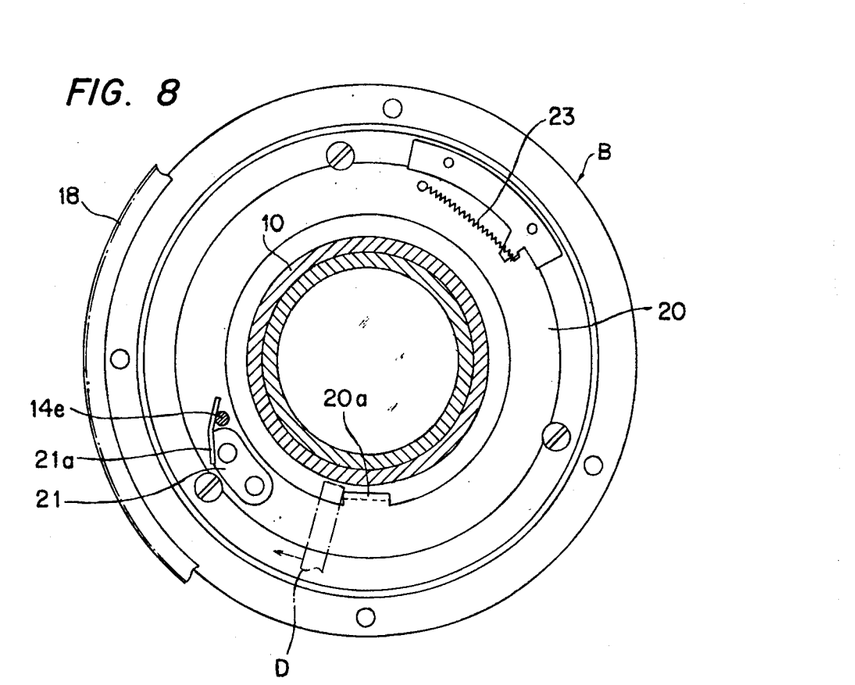

FIG. 8 further shows another embodiment of this kind of following system. The same numerals are only attached respectively to the parts indentical with or similar to those in FIGS. 6 and 7 and the explanation shall be omitted.

Figure 9:
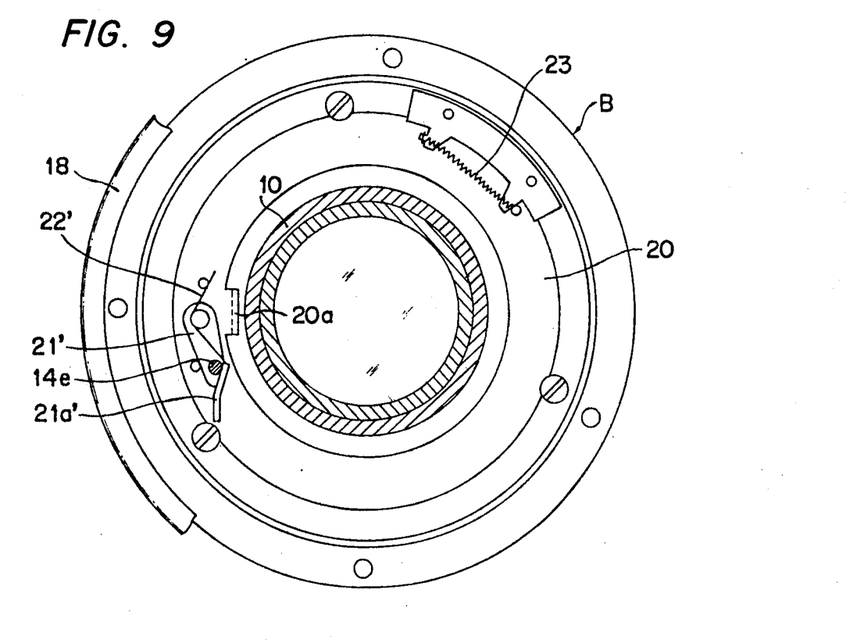
Figure 10:
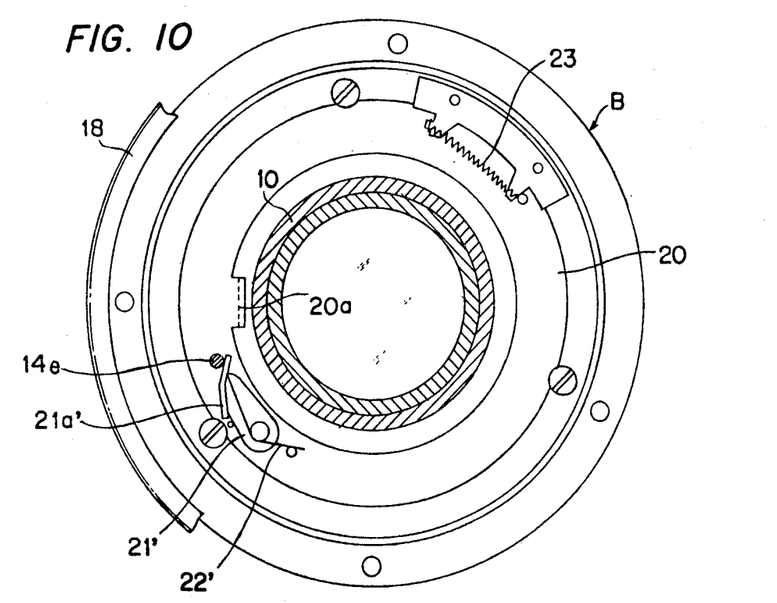

FIGS. 9 and 10 show still other embodiments than the system shown in FIG. 4 or 5. In these embodiments, instead of the sliding piece 21, a rotating piece 21' is pivoted on diaphragm operating ring 20 as that, when the diaphragm operating ring 20 is rotated clockwise against the spring 23, the pin 14e will be moved out to control the diaphragm blade means F. In this case, the parts having the functions identical with those of the parts shown in FIG. 4 or 5 are shown by attaching dashes.

Figure 11:
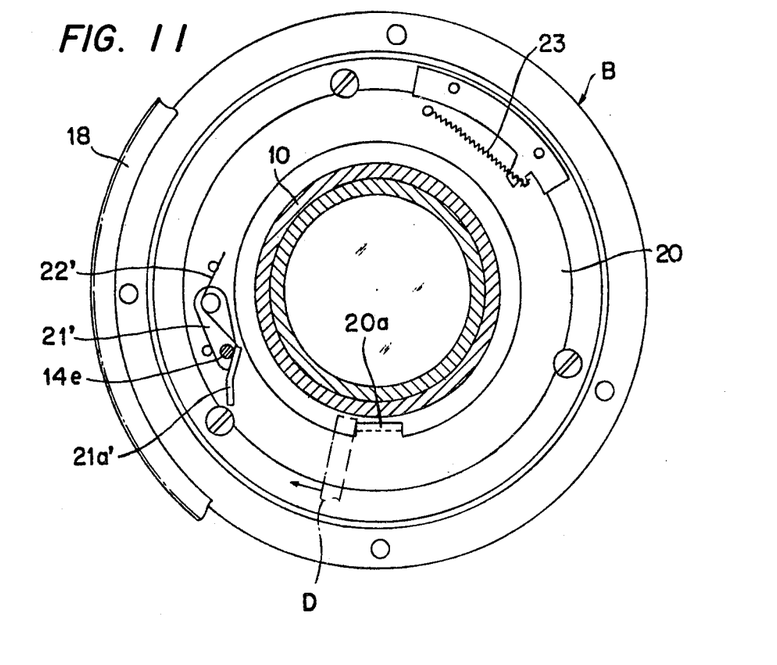
Figures 12, 13, 14:
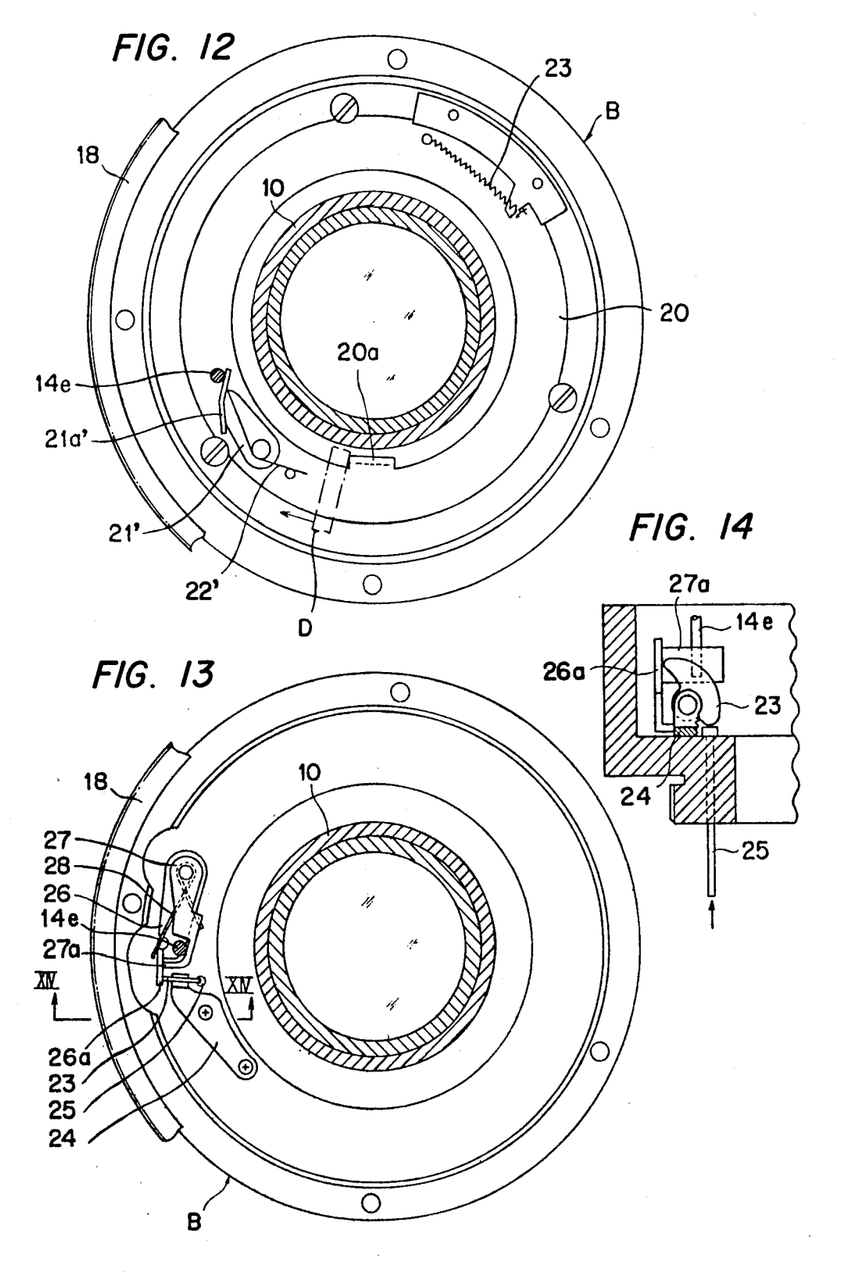
FIG. 14 is a sectional view along line XIV—XIV in FIG. 13.

FIGS. 11 and 12 show embodiments in the case that the embodiments shown in FIGS. 9 and 10 are respectively modified so that the diaphragm operating ring 20 may be rotated following the diaphragm operating mechanism provided within the camera body.

As evident in this explanation, in case the actuating direction of the diaphragm operating mechanism built in the camera is different depending on the differences of the camera maker and the kind of the camera, when the ring assembly consisting of the mount assembly B, diaphragm operating ring 20 and various parts 21, 21', 22 and 22' related with it and, as required, the diaphragm controlling cam ring 17, diaphragm correcting cam ring 19 and diaphragm setting ring 18 are merely respectively interchanged, an interchangeable lens adapted for it will be able to be readily provided. Further, in such case that the connecting position of the diaphragm operating mechanism on the camera side and the diaphragm operating ring 20 is different, the bent piece 20a forming position may be made different or several kinds of the ring assembly may be prepared in advance.

In the above, there have been explained the embodiments formed so as to be adapted for cameras of a type wherein the diaphragm operating mechanism on the camera side rotates concentrically with the optical axis. Now, embodiments formed so as to be adapted for cameras of a type wherein the above mentioned diaphragm operating mechanism advances and retreats in the direction of the optical axis shall be explained.

In FIGS. 13 and 14, numeral 23 indicates a lever rotatably supported on a bracket 24 secured on the inside bottom surface of the mount assembly B, numeral 25 indicates a diaphragm operating pin inserted slidably in the direction of the optical axis in the end wall of the mount assembly B and to be engaged with the above mentioned diaphragm operating mechanism when the lens is mounted on the camera body and numeral 26 indicates an interlocking lever supported rotatably on the inside bottom surface of the mount assembly B and having a bent portion 26a engaging with one end portion of the lever 23. Numeral 27 indicates a diaphragm operating lever supported rotatably on the same axis as of the interlocking lever 26 and having an arm 27a engaging with the pin 14e of the diaphragm operating lever 14 and contacting the bent portion 26a of the interlocking lever 26. Numeral 28 indicates a spring stretched so that the interlocking lever 26 and diaphragm operating lever 27 may be pulled with each other. When, instead of the mount assembly B shown in FIG. 2, the thus formed mount assembly B is fitted to the lens barrel assembly A and, in the same manner as in the above described case, the diaphragm operating pin 25 is pushed in the direction indicated by the arrow in FIG. 14 by the diaphragm actuating mechanism in relation to the movement of the shutter button or mirror on the camera body side, the lever 23 will be rotated counterclockwise and at the same time, the interlocking lever 26 and diaphragm operating lever 27 will be rotated clockwise in FIG. 13 to move the pin 14e in the same direction. Therefore, in the same manner as in the above described case, the diaphragm operating lever 14 will be rotated clockwise in FIG. 3 with the pin 14a as a rotating axis and the diaphragm blades 12 will be moved from the fully opened position to the minimum diaphragm aperture position. Thus, after the pin 14d contacts the diaphragm controlling cam 17a or the diaphragm correcting cam 19a and the diaphragm aperture is determined, by the rotation of the member 23, only the interlocking lever 26 will be further rotated clockwise and the diaphragm operating pin 25 will reach the fully pushed position. When the above mentioned diaphragm operating mechanism is returned to the original position as operatively connected with the movement of the mirror into the light path after the end of the photographing, the pressing on the diaphragm operating pin 25 will be released, therefore the member 23, interlocking lever 26 and diaphragm operating lever 27 will be again returned to the illustrated positions by a spring or the like (not illustrated) and, as a result, the diaphragm blades 12 will be returned again to fully opened position. As evident from the above explanation, even in the case of an interchangeable lens adapted for a camera formed so that, when the diaphragm operating mechanism on the camera side moves in the direction of the optical axis, the diaphragm blade means F may be actuated, the mount assembly B of the arrangement adapted for it, diaphragm controlling cam ring 17, diaphragm setting ring 18 and diaphragm correcting cam ring 19 will be only substantially respectively interchanged and such other parts as the lens barrel assembly A and diaphragm actuating lever 14 will be able to be utilized in common.

The above explained embodiment are mere exemplifications. Various modifications and corrections are possible. These all belong to the scope of the present invention. For example, the interchangeable lens shown as an embodiment is formed as a zoom lens but is not always limited to it. It needless to say that the present invention can be applied as it is to various fixed focus interchangeable lenses requiring diaphragm correcting cam ring.

I claim:

1. An interchangeable lens for cameras comprising a lens barrel assembly including therein a lens system and a diaphragm blade means arranged in said lens system and a diaphragm operating lever connected to said diaphragm blade means, a separate mount assembly interchangeably secured to said lens barrel assembly to be fitted to all types of cameras and including therein an operating means engageable with said diaphragm operating lever to operate said diaphragm operating lever, wherein said operating means comprises a diaphragm operating ring rotatable concentrically with the optical axis and biasing in one direction, and a sliding plate supported movably concentrically with the optical axis on said diaphragm operating ring and biased in the direction reverse to that of said diaphragm operating ring and engaged with said diaphragm operating lever, and a diaphragm controlling cam ring rotatably held concentrically with the optical axis between said lens barrel assembly and mount assembly and engageable with said diaphragm operating lever, said interchangeable lens being adapted for a plurality of different types of cameras by selection of different types of mount assemblies having different operating means.

2. An interchangeable lens for cameras comprising a lens barrel assembly including therein a lens system and a diaphragm blade means arranged in said lens system and a diaphragm operating lever connected to said diaphragm blade means, a separate mount assembly interchangeably secured to said lens barrel assembly to be fitted to all types of cameras and including therein an operating means engageable with said diaphragm operating lever to operate said diaphragm operating lever, wherein said operating means comprises a diaphragm operating ring rotatable concentrically with the optical axis and biased in one direction, and a member secured on said diaphragm operating ring and engaged with said diaphragm operating lever, and a diaphragm controlling cam ring rotatably held concentrically with the optical axis between said lens barrel assembly and mount assembly, and engageable with said diaphragm operating lever, said interchangeable lens being adapted for a plurality of different types of cameras by selection of different types of mount assemblies having different operating means.

3. An interchangeable lens for cameras comprising a lens barrel assembly including therein a lens system and a diaphragm blade means arranged in said lens system and a diaphragm operating lever connected to said diaphragm blade means, a separate mount assembly interchangeably secured to said lens barrel assembly to be fitted to all types of cameras and including therein an operating means engageable with said diaphragm operating lever to operate said diaphragm operating lever to operate said diaphragm operating lever, wherein said operating means comprises a diaphragm operating ring rotatable concentrically with the optical axis and biased in one direction, and a lever rotatably supported on said diaphragm operating ring and urged so as to be engaged with said diaphragm operating lever, and a diaphragm controlling cam ring rotatably held concentrically with the optical axis between said lens barrel assembly and mount assembly, and engageable with said diaphragm operating lever, said interchangeable lens being adapted for a plurality of different types of cameras by selection of different types of mount assemblies having different operating means.

4. An interchangeable lens for cameras comprising a lens barrel assembly including therein a lens system and a diaphragm blade means arranged in said lens system and a diaphragm operating lever connected to said diaphragm blade means, a separate mount assembly interchangeably secured to said lens barrel assembly to be fitted to all types of cameras and including therein an operating means engageable with said diaphragm operating lever to operate said diaphragm operating lever, wherein said operating means comprises a first lever supported in said mount assembly so as to be rotatable in a plane including the optical axis, a second lever supported in said mount assembly so as to be rotatable in a plane perpendicular to the optical axis and engaged with said first lever, a third lever rotatably supported in said mount assembly concentrically with said second lever and engaged with said diaphragm operating lever and engageable with said second lever, and a spring stretched between said second and third levers and urging said second and third levers so as to engage them with each other, and a diaphragm controlling cam ring rotatably held concentrically with the optical axis between said lens barrel assembly and mount assembly and engageable with said diaphragm operating lever, said interchangeable lens being adapted for a plurality of different types of cameras by selection of different types of mount assemblies having different operating means.

* * * * *